United States Patent
Pateux et al.

(10) Patent No.: US 9,066,107 B2
(45) Date of Patent: Jun. 23, 2015

(54) METHODS FOR ENCODING AND DECODING SEQUENCE IMPLEMENTING A MOTION COMPENSATION, CORRESPONDING ENCODING AND DECODING DEVICES, SIGNAL AND COMPUTER PROGRAMS

(75) Inventors: Stephane Pateux, Rennes (FR); Nathalie Cammas, Sens de Bretagne (FR)

(73) Assignee: France Telecom, Paris (FR)

( * ) Notice: Subject to any disclaimer, the term of this patent is extended or adjusted under 35 U.S.C. 154(b) by 731 days.

(21) Appl. No.: 13/146,833

(22) PCT Filed: Jan. 26, 2010

(86) PCT No.: PCT/FR2010/050115
§ 371 (c)(1),
(2), (4) Date: Nov. 9, 2011

(87) PCT Pub. No.: WO2010/086545
PCT Pub. Date: Aug. 5, 2010

(65) Prior Publication Data
US 2012/0051430 A1   Mar. 1, 2012

(30) Foreign Application Priority Data

Jan. 28, 2009 (FR) ...................................... 09 50510

(51) Int. Cl.
*H04N 7/32* (2006.01)
*H04N 19/523* (2014.01)
(Continued)

(52) U.S. Cl.
CPC ........... *H04N 19/523* (2014.11); *H04N 19/105* (2014.11); *H04N 19/176* (2014.11);
(Continued)

(58) Field of Classification Search
CPC . H04N 19/105; H04N 19/176; H04N 19/513; H04N 19/61; H04N 19/523; H04N 19/194; H04N 19/23; H04N 19/53; H04N 19/54; H04N 19/17

USPC ............. 375/240.16, 240.13, 240.15, 240.25, 375/240.28
See application file for complete search history.

(56) References Cited

U.S. PATENT DOCUMENTS

| | | | |
|---|---|---|---|
| 2002/0168008 A1* | 11/2002 | Ishikawa | 375/240.15 |
| 2005/0152452 A1* | 7/2005 | Suzuki | 375/240.16 |

(Continued)

FOREIGN PATENT DOCUMENTS

| | | |
|---|---|---|
| EP | 1261212 A2 | 11/2002 |
| FR | 2917872 A1 | 12/2008 |
| WO | WO 2009007580 A2 * | 1/2009 |

OTHER PUBLICATIONS

De Forni et al. "On the Benefits of Leaf Merging in Quad-Tree Motion Models". IEEE International Conference on Image Processing, vol. 2, Sep. 2005, pp. 1-4.*

(Continued)

*Primary Examiner* — Christopher S Kelley
*Assistant Examiner* — Zhihan Zhou
(74) *Attorney, Agent, or Firm* — David D. Brush; Westman, Champlin & Koehler, P.A.

(57) ABSTRACT

A method is provided for encoding an image sequence, including the step of dividing a reference image into blocks and a prediction step that includes the following steps: determining monitoring vectors associated with a common image and dividing the same into sub-blocks defining a first partition; determining monitoring vectors associated with an image to be compensated and dividing the same into sub-blocks defining a first partition obtaining a common partitioning into basic sub-blocks; determining first and second sets of monitoring vectors for the basic sub-blocks; movement-compensating a sub-block of the image to be compensated towards a sub-block of the common image.

12 Claims, 5 Drawing Sheets

(51) Int. Cl.
| | |
|---|---|
| H04N 19/105 | (2014.01) |
| H04N 19/176 | (2014.01) |
| H04N 19/513 | (2014.01) |
| H04N 19/61 | (2014.01) |
| H04N 19/17 | (2014.01) |
| H04N 19/194 | (2014.01) |
| H04N 19/23 | (2014.01) |
| H04N 19/53 | (2014.01) |
| H04N 19/54 | (2014.01) |

(52) U.S. Cl.
CPC ............ *H04N19/513* (2014.11); *H04N 19/61* (2014.11); *H04N 19/17* (2014.11); *H04N 19/194* (2014.11); *H04N 19/23* (2014.11); *H04N 19/53* (2014.11); *H04N 19/54* (2014.11)

(56) References Cited

U.S. PATENT DOCUMENTS

| | | | | |
|---|---|---|---|---|
| 2007/0268967 | A1* | 11/2007 | Demos | 375/240.15 |
| 2009/0116558 | A1* | 5/2009 | Chen et al. | 375/240.16 |
| 2009/0167775 | A1* | 7/2009 | Lu et al. | 345/547 |
| 2009/0290643 | A1* | 11/2009 | Yang | 375/240.16 |
| 2010/0189172 | A1* | 7/2010 | Pateux et al. | 375/240.01 |

OTHER PUBLICATIONS

Ishwar et al. "On Spatial Adaptation of Motion-Field Smoothness in Video Coding". IEEE Transactions on Circuits and Systems for Video Technology, vol. 10, No. 6, Sep. 2000, pp. 980-989.*

Liu et al. "Direct Mode Coding for B Pictures Using Virtual Reference Picture". IEEE International Conference on Multimedia and Expo, Jul. 2007, pp. 1363-1366.*

French Search Report and Written Opinion dated Oct. 27, 2009 for corresponding French Application No. FR0950510, filed Jan. 28, 2009.

International Search Report dated Apr. 1, 2010 for corresponding International Application No. PCT/FR2010/050115, filed Jan. 26, 2010.

Da Liu et al., "Direct Mode Coding for B Pictures Using Virtual Reference Picture" IEEE International Conference on Multimedia and Expo, Jul. 1, 2007, pp. 1363-1366, XP031123887.

Soo-Chul Han et al., "Spatiotemporal Subband/Wavelet Coding of Video with Object-Based Motion Information" International Conference on Image Processing, Oct. 26, 1997-Oct. 29, 1997 pp. 629-632, XP010254013.

De Forni R. et al., "On the Benefits of Leaf Merging in Quad-Tree Motion Models" IEEE International Conference on Image Processing, vol. 2, Sep. 11, 2005-Sep. 14, 2005 pp. 858-861, XP010851189.

Prakash Ishwar et al., "On Spatial Adaptation of Motion-Field Smoothness in Video Coding" IEEE Transactions on Circuits and Systems for Video Technology, vol. 10, No. 6, Sep. 1, 2000, XP011014098.

Sharaf A et al., "Motion Compensation Using Spatial Transformations with Forward Mapping" Signal Processing. Image Communication, Elsevier Science Publishers, Amsterdam, NL, vol. 14, No. 3, Jan. 4, 1999, pp. 209-227, XP004144075.

Altunbasak Y. et al., "Two-Dimensional Object-Based Coding Using a Content-Based Mesh and Affine Motion Parameterization" IEEE International Conference on Image Processing, vol. 2, Oct. 23, 1995-Oct. 26, 1995 pp. 394-397, XP010197108.

English Translation of the Written Opinion dated Apr. 1, 2010 for corresponding International Application No. PCT/FR2010/050115, filed Jan. 26, 2010.

English Translation of the International Preliminary Report on Patentability dated Aug. 2, 2011 for corresponding International Application No. PCT/FR2010/050115, filed Jan. 26, 2010.

Bertalmio et al., "Image Inpainting", Proceedings of the 27th annual conference on Computer graphics and interactive techniques, p. 417-424, Jul. 2000.

* cited by examiner

METHODS FOR ENCODING AND DECODING SEQUENCE IMPLEMENTING A MOTION COMPENSATION, CORRESPONDING ENCODING AND DECODING DEVICES, SIGNAL AND COMPUTER PROGRAMS

CROSS-REFERENCE TO RELATED APPLICATIONS

This Application is a Section 371 National Stage Application of International Application No. PCT/FR2010/050115, filed Jan. 26, 2010 and published as WO 2010/086545 A1 on Aug. 5, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of images sequences. The disclosure pertains especially to the processing of video image sequences or scenes that can be represented by means of motion tubes implementing a prediction by forward motion compensation.

The disclosure can be applied especially to video encoding implemented in current video encoders (MPEG, H.264, etc) and future (H.265 or ISO/MPEG) video encoders.

BACKGROUND OF THE DISCLOSURE

In present-day hybrid video encoding schemes, the images are encoded in two phases, a first phase of prediction by motion compensation followed by a second phase of encoding of prediction residues.

Motion compensation techniques include the known technique of backward motion compensation, an example of which is illustrated in FIG. 1A. Backward motion compensation enables the prediction of an image Ic, from at least one reference image Ir in taking account of the shift vectors pointing from the current image to one or more reference images.

This prediction by backward motion compensation comprises two main steps:
the image to be predicted Ic is divided into a set of blocks;
for each block of this image to be predicted Ic, a prediction is made by means of a shift vector pertaining to a shift relative to the reference image Ir.

Thus, any point or pixel of a considered block of the image to be predicted Ic is assigned the value of the point of the corresponding reference image, shifted by the value of the shift vector associated with the block considered. This technique makes it possible to provide a prediction value for each point of the image to be predicted.

Motion compensation techniques also include what is known as "forward" motion compensation, an example of which is illustrated in FIG. 1B. Forward motion compensation enables the prediction of an image Ic from at least one reference image Ir in taking account of the shift vectors pointing from one or more reference images Ir to the current image Ic.

This prediction by forward motion compensation comprises two main steps:
the reference image Ir is divided into a set of reference blocks;
for each reference block of the reference image, a shift vector is set up and for each point of this reference block, the point of the image to be predicted Ic is assigned the value of the point of the reference image, shifted by the shift vector.

One drawback of this technique of forward motion compensation is that it gives rise to the appearance of overlap zones when several blocks overlap one another, these overlap zones being referenced R in FIG. 1B. Furthermore, the use of different shifts on the forward projected blocks also causes the appearance of holes zones between the blocks, these holes being denoted as D in FIG. 1B.

The absence of an assigning of values in the holes limits the performance of the proposed encoding scheme.

A solution has been proposed in the French patent application FR 2 917 872 filed on behalf of the present Applicant.

This technique relies on the use of motion tubes to represent the sequence of images. These motion tubes move in space in the course of time, following the paths of motion of the sequence. This "temporal persistence" of the tubes provides for a continuous representation of the video sequence and the efficient representation of the zones of both continuity and discontinuity of the motion of a sequence.

For a given motion tube, initialized in a reference image, the prediction of an image to be predicted belonging to this same tube is obtained by forward projection of each block of the reference image by means of one or more motion vectors.

One drawback of this technique is that prediction by forward motion compensation of an image to be predicted of a motion tube uses only the reference image in which the motion tube is initialized. Now this reference image can be very distant from the image to be predicted. Consequently, the efficiency of prediction is all the more limited as the reference image is distant from the image to be predicted.

It is therefore necessary to provide novel image encoding/decoding techniques implementing prediction by forward motion compensation, enabling these prior-art techniques to be improved.

SUMMARY

An embodiment of the invention is directed to a method for encoding a sequence of images comprising a step for dividing a reference image into blocks and a prediction step associating at least one block of a current image of the sequence with at least one corresponding block in at least one image of the sequence to be motion-compensated, the image or images to be compensated for having been previously encoded.

According to an embodiment of the invention, the prediction step comprises the following steps for at least one given block of the reference image:
determining a plurality of control vectors associated with the current image for the given block, each representing a shift between a characteristic point of the given block and a corresponding position of the characteristic point in the current image, and dividing the given block into sub-blocks in taking account of a motion between the reference image and the current image, defining a first partition,
determining a plurality of control vectors associated with the image to be compensated for in the given block, each representing a shift between a characteristic point of the given block and a corresponding position of the characteristic point in the image to be compensated for, and dividing the given block into sub-blocks in taking account of a motion between the reference image and the image to be compensated for, defining a second partition, obtaining a common partitioning into sub-blocks for the given block, called basic sub-blocks, by comparison of the first and second partitions, determining a first set of control vectors for the basic sub-blocks from the control vectors associated with the current image, determining a second set of control vectors for the basic sub-blocks from the control vectors associated with the image to be compensated for, motion-compensating at least one sub-block of the image to be compensated for, corresponding to at least one basic sub-block shifted in motion by means of the second set of control vectors towards at least one sub-block of the current image corresponding to at least one basic sub-block shifted in motion by means of the first set of control vectors.

An embodiment of the invention thus proposes to improve existing techniques of prediction by forward motion compensation, especially when the image to be predicted (the current image) is distant (in time or by its content) from the reference image classically used for motion compensation.

To this end, an embodiment of the invention uses one or more "intermediate" images to be motion-compensated in order to predict the current image. These images to be compensated for have the advantage of being closer (in time or by their content) to the current image.

The motion model is deemed to be defined by a set of control vectors as described in the French patent application number 0854465 filed on 1 Jul. 2008 on behalf of the present Applicant, proposing a novel technique of prediction by motion compensation aimed at obtaining a representation of natural motion while at the same time limiting the complexity added, whether in terms of computations or else again in terms of the number of parameters to be transmitted.

An estimation is then made, through the control vectors, of the motion in each image to be compensated for as compared with the reference image, and the motion in the current image relatively to this same reference image.

It is then possible to predict the current image (or a region of this image) by forward motion compensation, from the image or images to be motion-compensated.

According to one particular embodiment of the invention, the given block in the reference image and the corresponding blocks in the image to be compensated for and in the current image belong to a same motion tube, initialized in said reference image.

Such motion tubes are described especially in the French patent application FR 2 917 872 mentioned here above.

In other words, an embodiment of the invention proposes to predict a block of a current image belonging to a motion tube by using a technique of forward motion compensation applied to at least one corresponding block of one or more images to be compensated for, belonging to the same tube. This image to be motion-compensated is distinct from the reference image of the tube in which the tube is initialized (corresponding to the instant of creation of the tube).

Thus a single motion tube is used to predict the block of the current image. It is therefore enough to encode the motions of a single motion tube to predict a block of the current image or a single family of motion tubes, all initialized in the reference image, to predict the current image. Besides, this tube may also benefit from a value of texture encoded in the image to be compensated for (and not on the reference image). This value of texture in the image to be compensated for can be encoded from items of information other than those of the tube considered.

An alternative approach is that of creating a set of motion tubes initialized on several distinct reference images and estimating the motion of each of the tubes towards the current image to be predicted. However, this technique is costly in terms of quantity of information to be transmitted because it requires the encoding of the motions of several families of motion tubes.

Forward motion compensation using an image different from the reference image of the motion tubes to build the prediction of a current image to be encoded is therefore not a simple matter.

According to one particular characteristic of an embodiment of the invention, at least one of the dividing steps implements two successive passes or runs of dividing into a sub-blocks of adaptive size.

For example, the first pass is an "explicit" pass taking account of the motion proper to the given block and the second pass is a "implicit" pass implemented on the sub-blocks obtained during the first dividing pass taking account of the motion inherent to the given block and the motion of the blocks neighboring the given block.

According to another aspect of an embodiment of the invention, at least one of the dividing steps implements at least two iterations, until a predetermined stop criterion, proper to said dividing step delivering said first and/or second partition, is reached, said stop criterion belonging to the group comprising:
    a minimum size of a sub-block;
    a maximum number of divisions;
    a difference between the control vectors associated with two sub-blocks below a predetermined threshold.

Thus the first partition, obtained in taking account of the motion between the reference image and the current image, and the second partition, obtained in taking account of the motion between the reference image and the image to be compensated for can be different, since the criterion of dividing into sub-blocks (i.e the stop criterion) is dependent on the image considered (current image or image to be compensated for) and since the input data (i.e. the control vectors) can be distinct between the two dividing steps.

For example, the control vectors for the given block or basic sub-block are each associated with a vertex of the given block or basic sub-block.

Thus for a 2D image, four control vectors are associated with the block, one control vector being associated with each vertex or corner of the block. For a 3D image, eight vectors are associated with the block, which actually corresponds to a cube, one control vector being associated with each corner of the block. It is also possible to associate these control vectors with other points of the block, corresponding for example to a contour. Similarly, the number of control vectors associated with a block is not unchangeably fixed.

According to another particular characteristic, the encoding method includes a step of insertion, into a signal representing the sequence of images, of at least one piece of information on identification indicating the reference image and the image or images to be motion-compensated, used to encode the current image and at least one piece of information on rebuilding of the control vectors for the given block.

An embodiment of the invention also pertains to a computer program comprising instructions to implement the encoding method described here above when the program is executed by a processor.

Thus, the encoding method according to the invention can be implemented in various ways, especially in wired form or in software form.

In another embodiment, the invention pertains to a device for encoding a sequence of images, comprising means for dividing a reference image into blocks and prediction means associating at least one block of a current image of the sequence with at least one corresponding block in at least one image, of the sequence, to be motion-compensated, the image or images to be compensated for having been previously encoded.

According to an embodiment of the invention, the prediction means comprise the following means, activated for at least one given block of the reference image:
- means for determining a plurality of control vectors associated with the current image for the given block, and means for dividing the given block into sub-blocks in taking account of a motion between the reference image and the current image, defining a first partition,
- means for determining a plurality of control vectors associated with the image to be compensated for, for the given block and means for dividing the given block into sub-blocks in taking account of a motion between the reference image and the image to be compensated for, defining a second partition,
- means for obtaining a common partitioning into sub-blocks for the given block, called basic sub-blocks, by comparison of the first and second partitions,
- means for determining a first set of control vectors for the basic sub-blocks from the control vectors associated with the current image, and a second set of control vectors for the basic sub-blocks from the control vectors associated with the image to be compensated for,
- means for motion-compensating at least one sub-block of the image to be compensated for, corresponding to at least one basic sub-block shifted in motion by means of the second set of control vectors towards at least one sub-block of the current image corresponding to at least one basic sub-block shifted in motion by means of the first set of control vectors.

An encoding device of this kind is especially adapted to implementing the encoding method described here above. It is for example an MPEG or H.264 type video encoder or an encoder according to a future video compression standard, for example H.265.

An embodiment of the invention also pertains to a signal representing a sequence of images encoded according to the encoding method described here above. Such a signal comprises at least one piece of information on identification indicating a reference image and at least one image to be motion-compensated, these images being used to encode a current image, and at least one piece of information on rebuilding control vectors for a given block of the reference image.

This signal could of course comprise the different characteristics pertaining to the encoding method according to an embodiment of the invention.

An embodiment of the invention also pertains to a method for decoding a signal representing a sequence of images as described here above.

Such a method comprises the following steps for at least one current image:
- determining a reference image and at least one image to be compensated for, used to encode the current image, by means of at least one piece of information on identification present in the signal,
- obtaining information on rebuilding control vectors for at least one given block of the reference image,
- predicting the current image comprising the following sub-steps for said at least one given block:
  - determining, from the pieces of rebuilding information, a plurality of control vectors associated with the current image for the given block, and dividing said given block into sub-blocks taking account of a motion between the reference image and the current image defining a first partition,
  - determining, from the pieces of rebuilding information, a plurality of control vectors associated with the image to be compensated for, for the given block and dividing the given block into sub-blocks, taking account of a motion between the reference image and the image to be compensated for, defining a second partition,
  - obtaining a common partitioning into sub-blocks for the given block, called basic sub-blocks, by comparison of the first and second partitions;
  - determining a first set of control vectors for the basic sub-blocks, from the control vectors associated with the current image, and a second set of control vectors for the basic sub-blocks, from the control vectors associated with the image to be compensated for;
  - motion-compensating at least one sub-block of the image to be compensated for corresponding to at least one basic sub-block shifted in motion by means of the second set of control vectors towards at least one sub-block of the current image corresponding to at least one basic sub-block shifted in motion by means of the first set of control vectors.

The characteristics and advantages of this decoding method are the same as those of the encoding method. Consequently, they shall not be described in greater detail.

In another embodiment, the invention pertains to a computer program comprising instructions to implement the decoding method described here above, when said program is executed by a processor.

Thus, the decoding method according to an embodiment of the invention may be implemented in various ways, especially in wired form or in software form.

Finally, an embodiment of the invention pertains to a device for decoding a signal representing a sequence of images as described here above, comprising the following means, activated for at least one current image:
- means for determining a reference image and at least one image to be compensated for, used to encode the current image, from at least one piece of information on identification present in the signal,
- means for obtaining information on rebuilding control vectors for at least one given block of the reference image,
- means for predicting the current image comprising the following means, activated for said at least one given block:
  - means for determining, from the pieces of rebuilding information, a plurality of control vectors associated with the current image for the given block, and means for dividing the given block into sub-blocks taking account of a motion between the reference image and the current image defining a first partition,
  - means for determining, from the pieces of rebuilding information, a plurality of control vectors associated with the image to be compensated for, for the given block and means for dividing the given block into sub-blocks, taking account of a motion between the reference image and the image to be compensated for, defining a second partition,
  - means for obtaining a common partitioning into sub-blocks for the given block, called basic sub-blocks, by comparison of the first and second partitions;

means for determining a first set of control vectors for the basic sub-blocks, from the control vectors associated with the current image, and a second set of control vectors for the basic sub-blocks, from the control vectors associated with the image to be compensated for;

means for motion-compensating at least one sub-block of the image to be compensated for corresponding to at least one basic sub-block motion-shifted by means of the second set of control vectors towards at least one sub-block of the current image corresponding to at least one basic sub-block motion-shifted by means of the first set of control vectors.

A decoding device of this kind is especially adapted to implementing the decoding method described here above. It is for example an MPEG or H.264 type video encoder or an encoder according to a future video compression standard, for example H.265.

BRIEF DESCRIPTION OF THE DRAWINGS

Other features and advantages shall appear more clearly from the following description of a particular embodiment, given by way of a simple, illustrative and non-exhaustive example and from the appended drawings, of which.

DETAILED DESCRIPTION OF ILLUSTRATIVE EMBODIMENTS

1. General Principle

The general principle of an embodiment of the invention relies on the use of at least one intermediate image for the prediction by forward motion compensation of a current image, especially when the current image is at a great distance (in time or by its content) from a reference image. A motion compensation of the current image is then performed, using at least one or more images to be motion-compensated (intermediate images) that are closer to the current image than the reference image.

To this end, an embodiment of the invention defines both the motion of the current image relatively to the reference image and the motion of the motion-compensated image or images relatively to the reference image.

Figure 1A:
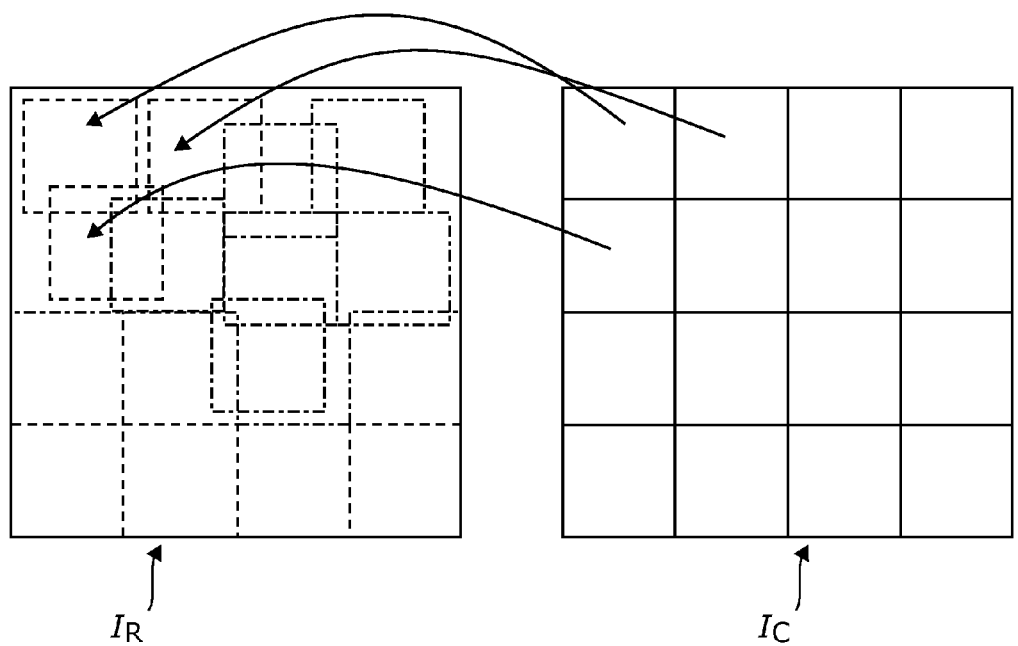
FIGS. 1A and 1B, presented with reference to the prior art, respectively illustrate the backward and forward motion compensation techniques.
Figure 1B:
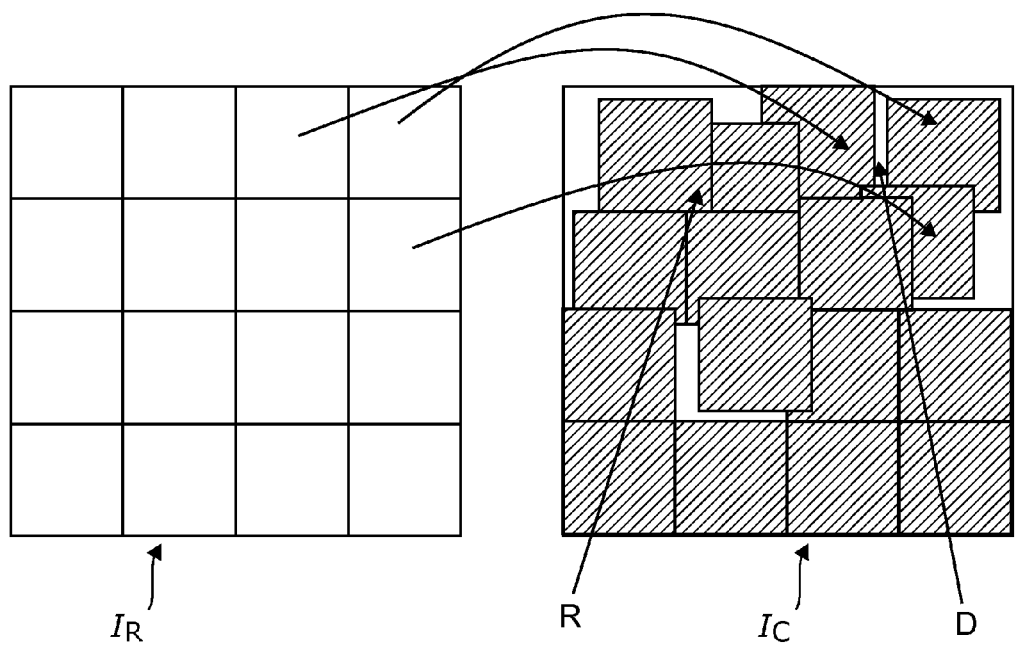
Figure 2:
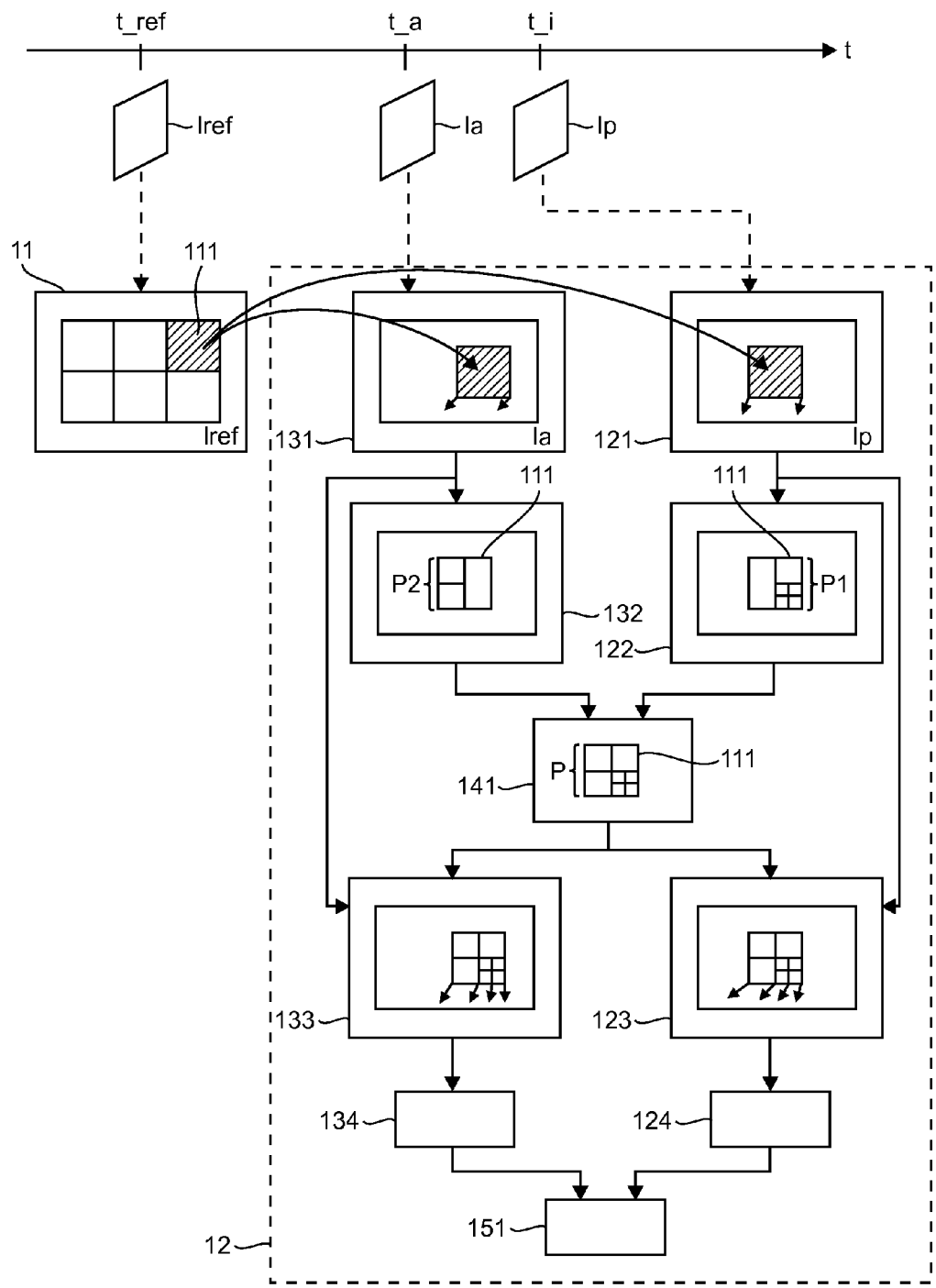
FIG. 2 illustrates the main steps of the encoding method according to one embodiment of the invention.

Referring to FIG. 2, we now present the main steps of the encoding method according to one embodiment of the invention. We consider for example a sequence comprising, inter alia, a reference image Iref corresponding to an instant t_ref of the sequence, an image to be motion-compensated Ia corresponding to an instant t_a of the sequence, and a current image to be predicted Ip corresponding to an instant t_i of the sequence.

It can be noted that the image to be motion-compensated Ia has been previously encoded/decoded. This image Ia is used to predict the current image by means of a forward motion compensation.

According to this embodiment, the reference image Iref is divided into blocks during a step 11 for dividing into blocks. Thereafter, we determine the motion of these blocks in the image to be compensated for Ia and the current image Ip.

It is then sought to predict the current image Ip during a prediction step 12. This prediction step 12 comprises the following steps implemented for at least one given block 111 of the reference image Iref:

determining 121 a plurality of control vectors associated with the current image Ip for the given block 111, each representing a shift between a characteristic point of the given block 111 and a corresponding position in the current image Ip;

dividing 122 the given block 111 of the reference image into sub-blocks, in taking account of a motion between the reference image Iref and the current image Ip, defining a first partition P1;

determining 131 a plurality of control vectors associated with the image to be compensated for Ia for the given block 111, each representing a shift between a characteristic point of the given block 111 and a corresponding position in the image to be compensated for Ia;

dividing 132 the given block 111 of the reference image into sub-blocks in taking account of the motion between the reference image Iref and the image to be compensated for Ia defining a second partition P2;

obtaining 141 a common partitioning P into sub-blocks for the given block 111, called basic sub-blocks, by comparison of the first partition and second partition P2. For example, if the first partition P1 and the second partition P2 are identical, then the common partitioning P is equal to P1 which is equal to P2. If the first partition P1 and the second partition P2 are different, the common partitioning P is defined by the union of the two partitions P1 and P2. For example, as illustrated in FIG. 2, the common partitioning P defines seven sub-blocks known as basic sub-blocks;

determining 123 a first set of control vectors for the basic sub-blocks from the control vectors associated with the current image Ip;

determining 133 a second set of control vectors for the basic sub-blocks from the control vectors associated with the image to be compensated for Ia;

effecting a first motion shift 124 of at least one basic sub-block of the reference image Iref towards the current image Ip by means of the first set of control vectors;

effecting a second motion shift 134 of at least one basic sub-block of the reference image Iref towards the image to be compensated for Ia by means of the second set of control vectors;

predicting 151 the sub-block of the current image Ip obtained during the first shift step 124 from the sub-block of the image to be compensated for Ia obtained during the second shift step 134.

The basic sub-blocks thus shifted can therefore get detached, thus giving rise to holes or else zones still overlapping one another.

An embodiment of the invention therefore proposes a technique of prediction using one or more forward motion-compensated images improving the prediction obtained from a single reference image and not having the drawbacks of the prior-art techniques.

For example, if we situate the description in the context of a sequence of images that can be represented by means of motion tubes as described in the French patent application FR 2 917 872 mentioned here above, and if the given block in the reference image and the corresponding blocks in the image to be compensated for and in the current image belong to a same motion tube initialized in the reference image, then, taking the above notations, we have:

t_ref: reference instant defined for the motion tubes or instant of creation of the motion tubes, corresponding to the reference image Iref;

t_a (potentially t_b): instant of images already encoded/decoded used for the prediction of a current image to be predicted by means of a forward motion compensation, corresponding to the image to be provided with motion compensated Ia (and possibly several images to be compensated for Ib);

t_i: "intermediate" instant where it is desired to project the encoded/decoded images used for the prediction, corresponding to the current image to be predicted.

An embodiment of the invention then proposes to carry out a motion compensation of a block defined at the instant t_ref in using the texture of a block defined at the instant t_a (potentially also at the instant t_b) to rebuild the value of a block defined at the instant t_i.

This approach offers especially the following advantages:

it enables the use of updated "textures" through the motion compensation performed on the basis of the previously encoded/decoded images to be compensated for (Ia, possibly Ib);

it is not necessary to re-utilize the reference image Iref defined at the instant t_ref to obtain an encoding or a rebuilding of the current image at the instant t_i, giving lower complexity to the proposed solution and avoiding multiple filtering operations of interpolation related to the multiple motion compensations according to the prior art;

for the encoding of the motion vectors, at most only one motion vector is needed for a sub-block that is to be predicted in the current image. It may be recalled that, for the prediction it is possible to use several images that are to be compensated for. Since the pieces of information on motion between these images to be compensated for and the reference image are already known, it is not necessary to encode several motion vectors, contrary what is traditionally done for "B" images in the hybrid encoder such as MPEG4-AVC;

it makes it possible to restrict the need for creating new motion tubes at different instants t_ref when the current image is at too great a distance from the reference image and thus makes it possible to gain in compression;

the motion path used corresponds to that of the block to be predicted.

In this context of a sequence of images represented by means of motion tubes, an embodiment of the invention proposes a prediction technique using a single block-wise encoded motion vector and one or more images to be compensated for, these images to be compensated for are not the reference image relative to which the motion has been defined. This embodiment of the invention therefore improves the prediction quality of a current image comprising a block belonging to a motion tube when the current image is distant from the reference image in which the tube is initialized, in using a motion compensation technique based on control vectors as described in the French patent application number 0854465 mentioned here above, while at the same time adapting it to an image (an image to be motion-compensated) which is not the image from which the motion tubes were created (reference image), to be projected on an image to be predicted (current image) in limiting the complexity and problems of interpolation.

More generally, the proposed prediction technique reduces the cost of encoding the prediction residue of the current image to be encoded, without increasing the cost of encoding the motion vectors, and offers limited operational complexity.

2. Description of One Embodiment of the Encoding Method

Here below, we provide a detailed description of the implementation of the different steps of the encoding method of FIG. 2, according to one particular embodiment. For the sake of clarity, the same numerical references as those defined for FIG. 2 are used.

We again consider a current image to be predicted Ip, a reference image Iref and at least one image to be motion-compensated in order to build the prediction Ia.

A) Determining Control Vectors

As indicated with reference to FIG. 2, at a step 121 (and 131 respectively), the control vectors associated with a current image Ip (and respectively the image to be compensated for Ia) are determined. These control vectors point from the reference image Iref towards the current image to be predicted Ip (respectively towards the image to be compensated for Ia).

Such control vectors are more specifically described in the above-mentioned French patent application number 0854465.

B) Obtaining First and Second Partitions

1) Principle

At a step 122 (and 132 respectively), the given block 111 is divided into sub-blocks in taking account of a motion between the reference image Iref and the current image Ip (respectively between the reference image Iref and the image to be compensated for Ia).

More specifically, it may be recalled that the blocks are defined on the regular grid of the reference image Iref (step 11 of dividing the reference image into blocks). It is then sought to express the motion of the blocks in the image to be compensated for Ia and in the current image Ip relatively to this reference instant.

The dividing step 122 (and 132 respectively) can implement two successive passes of dividing into sub-blocks of adaptive size. Each of these passes can implement at least one iteration of dividing until a first (and respectively a second) predetermined criterion for stopping the division is attained. The first and second division stopping criteria may be different. For example, such criteria take account of a predefined number of sub-blocks for the given block, a piece of information of similitude between the control vectors, a size of the given block, a minimum size of a sub-block, an indicator representing a number of divisions etc. For example, the information on similitude corresponds to a maximum difference between the control vectors. When this difference is below a threshold, the sub-blocks are no longer divided.

Thus, all the blocks of the reference image are not necessarily divided into sub-blocks, and the dividing into sub-blocks can vary from one block to another of the image. The partitioning into sub-blocks is therefore adaptive.

2) First Dividing Pass

Figure 3A:
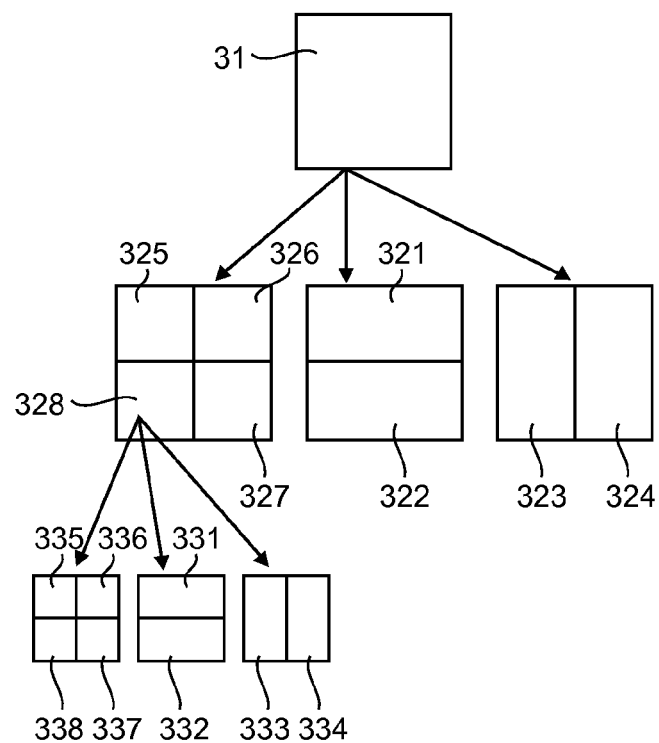
FIGS. 3A and 3B show examples of a first pass and a second pass of dividing into sub-blocks.

FIG. 3A illustrates the principle of the first pass of dividing into sub-blocks of adaptive size with one motion vector encoded per sub-block. In this figure, this pass implements two iterations of division. In a general framework, several levels of iterations can be defined.

In other words, the blocks of a reference image can be of adaptive size, i.e. they can be re-divided in order to estimate the motion by means of blocks, known as sub-blocks, that are smaller than the blocks obtained during the dividing of the reference image. For example, during a first iteration, a block 31 of a reference image can be divided into two horizontal sub-blocks 321, 322, two vertical sub-blocks 323, 324 or four square sub-blocks 325, 326, 327, 328, in dividing one direction or both directions by two. During a following iteration, the square sub-blocks 325, 326, 327, 328 may be divided in turn. For example, the square sub-block 328 can be divided into two horizontal sub-blocks 331, 332, two vertical sub-blocks 333, 334 or four square sub-blocks 335, 336, 337, 338.

A motion vector is associated with each sub-block derived from the operation of dividing into sub-blocks of adaptive size. The dividing of the blocks into sub-blocks improves the motion estimation and adapts the size of the blocks to the contour of the objects.

3) Second Dividing Pass

Figure 3B:
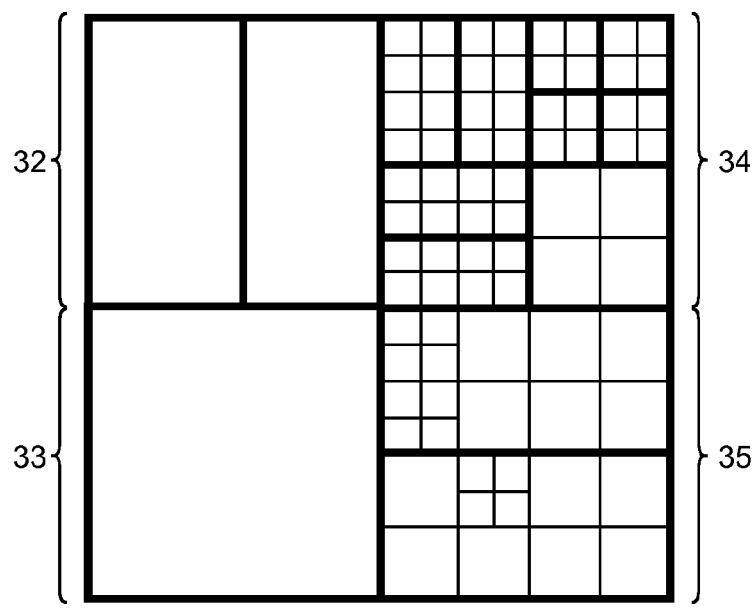

FIG. 3B illustrates an example of a first dividing pass followed by a second dividing pass for dividing into sub-blocks of adaptive size for the motion compensation.

More specifically, the blocks or sub-blocks derived from a dividing into sub-blocks of adaptive size can be re-divided for the motion compensation. Control vectors are then defined for the blocks or sub-blocks on the basis of the control vectors of the higher-level block or sub-block, in taking account of the connections encoded for this higher-level block or sub-block. These connections indicate whether the block or sub-block is connected to the block or sub-blocks situated above or to the left of the block or sub-block. An example of determination of the control vectors for sub-blocks from control vectors for a block is described in the French patent application number 0854465 referred to here above. For example, the block or sub-block $b_C$ is divided into four sub-blocks $b_{SC1}$, $b_{SC2}$, $b_{SC3}$ and $b_{SC4}$ (not shown in FIG. 3B). Four control vectors are determined for the block $b_C$, each being associated with a vertex or corner of the block.

For example, the following notations are used:

$v_{br}$ is the control vector associated with the corner situated at the bottom right hand of the block $b_C$;

$v_{bl}$ is the control vector associated with the corner situated at the bottom left hand of the block $b_C$;

$v_{tr}$ is the control vector associated with the corner situated at the top right hand of the block $b_C$;

$v_{tl}$ is the control vector associated with the corner situated at the top left hand of the block $b_C$.

The control vectors attached to the block $b_C$ are interpolated to define new control vectors for the sub-blocks.

For example, the following notations are used:

$v_{ml}$ is the control vector associated with the corner situated at the bottom left hand of the sub-block $b_{SC1}$, also corresponding to the corner situated at the top left hand of the sub-block $b_{SC3}$;

$v_{tm}$ is the control vector associated with the corner situated at the top right hand of the sub-block $b_{SC1}$, also corresponding to the corner situated at the top left hand of the sub-block $b_{SC2}$;

$v_{mr}$ is the control vector associated with the corner situated at the bottom right hand of the sub-block $b_{SC2}$, also corresponding to the corner situated at the top right hand of the sub-block $b_{SC4}$;

$v_{bm}$ is the control vector associated with the corner situated at the bottom right hand of the sub-block $b_{SC3}$ also corresponding to the corner situated at the bottom left hand of the sub-block $b_{SC4}$; and $v_{mm}$ is the control vector associated with the corner situated at the bottom right hand of the block $b_{SC1}$, also corresponding to the corner situated at the bottom left hand of the sub-block $b_{SC2}$, the corner situated at the top right hand of the sub-block $b_{SC3}$, and the corner situated at the top left hand of the sub-block $b_{SC4}$.

The control vectors for the sub-blocks are then determined from the control vectors for the block $b_C$, for example as follows:

$$v_{tm} = \frac{v_{tl} + v_{tr}}{2}, v_{bm} = \frac{v_{bl} + v_{br}}{2}, v_{ml} = \frac{v_{tl} + v_{bl}}{2},$$

$$v_{mr} = \frac{v_{tr} + v_{br}}{2} \text{ and } v_{mm} = \frac{v_{tl} + v_{tr} + v_{bl} + v_{br}}{4}.$$

This dividing process can be iterated until a criterion for stopping the dividing is reached, as described here above.

During this second dividing pass, no additional motion vectors are encoded for the sub-blocks (only the control vectors obtained at the end of the first pass are encoded).

As illustrated in FIG. 3B, if we consider a set of four blocks 32, 33, 34, 35 (where the size of the block 33 is represented by the hatched block), we obtain after the two dividing passes a set of sub-blocks. In this figure, certain blocks or sub-blocks have been divided into sub-blocks of adaptive size during the first pass (partitioning illustrated in bold lines), and then certain blocks or sub-blocks have been re-divided for the motion compensation during the second pass (partitioning illustrated in thin lines).

C) Determining a Common Partitioning

As already indicated, the motion compensation of a block from an image to be compensated for Ia (different from a reference image Iref) on a current image to be predicted Ip must take account of the motion of the given block 111 defined in the reference image Iref, both in the image to be compensated for Ia and in the current image Ip. The motion in each image to be compensated for Ia and current image Ip is estimated relatively to the same reference image Iref.

Now it may be recalled that the given block 111 of the reference image could have been partitioned into sub-blocks of adaptive size in the image to be compensated for Ia (i.e. in taking account of a motion between the reference image Iref and the image to be compensated for Ia) and/or in the current image Ip (i.e. in taking account of a motion between a reference image Iref and the current image Ip). It may be recalled that the dividing or partitioning of the given block 111 can be different in the current image Ip and in the image to be compensated for Ia.

Figures 4A, 4B:
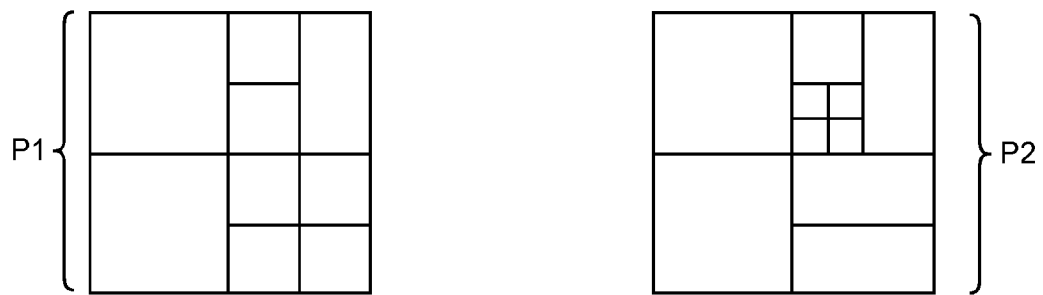
FIGS. 4A to 4C respectively illustrate a first partition, a second partition and a common partitioning of a block of the reference image.

Thus, at the end of the dividing step 122, we obtain a first partition P1 corresponding to a dividing into sub-blocks of the given block 111, linked to the information on motion of the reference image Iref towards the current image Ip. An example of a first partition of the given block 111, is illustrated in FIG. 4A.

At the end of the dividing step 132, we obtain a second partition P2 corresponding to a dividing into sub-blocks of the given block 111, related to the information on motion from the reference image Iref to the image to be compensated for Ia. An example of a second partition of the given block 111 is illustrated in FIG. 4B.

It is then necessary to find a common partitioning in the two images in order to associate the sub-blocks of the given block 111 in the current image Ip with those of the given block 111 in the image to be compensated for Ia.

Figure 4C:
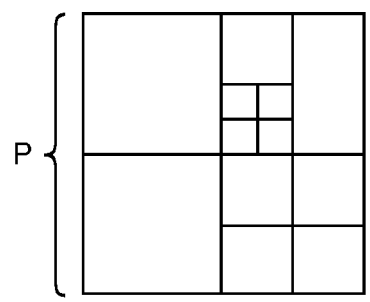

To this end, the two partitions P1 and P2 are compared in a step 141, in order to obtain a common partitioning P between these partitions P1 and P2 as illustrated in FIG. 4C. This common partitioning corresponds to the union of the partitions P1 (related to the motion towards the current image Ip) and P2 (linked to the motion towards the image to be compensated for Ia), and defines basic sub-blocks corresponding to the smallest sub-blocks obtained.

At each partitioning level making it possible to achieve a common partitioning P, the determining of the control vectors of the new sub-blocks is a function of the connections of the given block 111 with its neighbors in the current image Ip and respectively in the image to be compensated for Ia.

Thus, if the given block 111 in the current image Ip (and respectively in the image to be compensated for Ia) is connected to no neighboring block, the control vectors of the four new sub-blocks take the value of the control vectors of the sub-block at the previous level.

If the given block 111 is connected to one of its neighbors:
  if the criterion of sub-dividing into sub-blocks (i.e. the stop criterion) is attained, the control vectors of the new sub-blocks (basic sub-blocks) take the value of the control vectors of the sub-block at the previous level (i.e. at the higher partitioning level);
  if the criterion of sub-dividing into sub-blocks is not attained, the control vectors of the new sub-blocks are determined as described in paragraph B.3.

D) Compensation for a Given Block from an Image Ia to be Compensated for in the Current Image Ip The compensation for the given block 111 in the current image Ip from an image to be compensated for Ia (which is not a reference image, in which the motion tubes are initialized for example) can be done by applying the following algorithm for each basic sub-block extracted from the common partitioning P of the given block 111.

It can be noted that the basic sub-block can be shifted from the reference image Iref towards the current image Ip or the image to be compensated for Ia in a pixel motion corresponding to a multiple shift of entire pixels (i.e. shifting a pixel to another pixel) or sub-pixel motion corresponding to a shift of one pixel to a point which is not a pixel. In the latter case, it is necessary to interpolate the compensated texture to obtain a value of texture on the pixels that surround this point. The sub-pixel motion is then broken down into a pixel motion and a sub-pixel residue.

1) Case of a Pixel Motion

For each control vector vi from a basic sub-block, the following operations are performed for all the pixels (x,y) of the basic sub-block in the reference image Iref:
  the value wi*wt*Ia(x+dax, y+day) is accumulated with the points Ipred(x+dxCurr,y+dyCurr):

$Ipred(x+dxCurr,y+dyCurr)+=wi*wt*Ia(x+dax,y+day),$ the value wi*wt* is accumulated with the points: IWpred(x+dxCurr,y+dyCurr)

$IWpred(x+dxCurr,y+dyCurr)+=wi*wt.$ where:
Ipred is an accumulation image used to build the prediction of the current image Ip;
IWpred is an image of a weight used to standardize the predicted image;
wi is the weight associated with the control vector vi of the basic sub-block;
wt is the weight associated with the image to be compensated for Ia. If several images to be compensated for Ia are used for the prediction of a current image Ip, the weight wt is a function of the distance between the image to be compensated for and the current image. If only one image is used, wt is equal to 1;
(dxCurr, dyCurr) is the value of the control vector vi of the basic sub-block in the current image that is to be predicted;
(dax, day) is the value of the control vector vi of the basic sub-block in the image to be compensated for Ia.

2) Case of a Sub-Pixel Motion

For each control vector vi of a basic sub-block, the following operations are performed in taking up the previously defined notations:
retrieval of the closest pixel motion in breaking down the sub-pixel motion into a pixel motion (idxCurr, idyCurr) and a sub-pixel residue (fdxCurr, fdyCurr):
  dxCurr=idxCurr+fdxCurr,
  dyCurr=idyCurr+fdyCurr,
  with (idxCurr,idyCurr) being two integers such that the sub-pixel residues of motion (fdxCurr, fdyCurr) are included in the interval ]−0,5; 0,5[;
for any point (x,y) of the basic sub-block in the reference image Iref, compensation:
  the value wi*wt*Ia(x+dax−fdxCurr, y+day−fdyCurr) is accumulated with the points Ipred(x+idxCurr,y+idyCurr): Ipred(x+idxCurr,y+idyCurr)+=wi*wt*Ia(x+dax−fdxCurr, y+day−fdyCurr),
  the value wi*wt is accumulated with the points IWpred(x+idxCurr,y+idyCurr): IWpred(x+idxCurr,y+idyCurr)+=wi*wt.

Thus, with the pixel corresponding to the position (idxCurr,idyCurr) of the current image, we accumulate the texture of the image to be compensated for, shifted by the vector (dax−fdxCurr, day−fdyCurr). In other words, the sub-pixel residue of the motion in the current image is removed from the shift of the image to be compensated for.

E) Compensation for One or More Images to be Compensated for Ia on the Image to be Predicted Ip The image Ipred used to build the prediction of the current image Ip as well as the weight image IWpred serving to standardize the prediction image obtained are first of all initialized at 0.

In this embodiment, the steps for determining a common partitioning (paragraph C) and for compensation for a block (paragraph D) described here above are implemented for all the images to be compensated for Ia (which are not reference images) serving for the prediction of the current image Ip.

Once all the images Ia used for the prediction have been motion-compensated, the image Ipred is standardized by means of the image with the weight image IWpred, using the following algorithm:
  for every x in the image Ipred,
  if IWpred(x) is different from 0, then Ipred(x) is divided by IWpred(x)
  else Ipred(x) takes the value UNDEF (UNDEF being defined at a predefined value, for example the value 0).

F) Filling of Non-Predicted Values in the Image Ipred

A classic technique of restoration or inpainting as proposed in the document by M. Bertalmio et al., "Image Inpainting", can be used in order to fill any gaps or holes that may remain in the image Ipred and obtain a prediction of the current image. These holes correspond to the pixels whose value had been positioned at UNDEF.

The image Ipred is then used as a prediction image for the current image to be encoded Ip.

3. Signal

Once the images have been encoded, the signal representing the sequence of images encoded according to the above-described encoding method can be transmitted to a decoder and/or stored on a recording medium.

The signal also conveys particular information.

More specifically, such a signal comprises at least one piece of identifying information indicating a reference image and at least one image to be motion-compensated, used during the encoding of a current image, and at least one piece of information on rebuilding control vectors for a given block of the reference image.

The pieces of information on identification makes it possible to specify those images that are reference images and images to be motion-compensated that had been used during the encoding of the current image. In this way, the decoder can use these same images to carry out the prediction of the current image.

The pieces of information on rebuilding include for example the flags flag_lc and flag_tc.

4. Decoding

Figure 5:
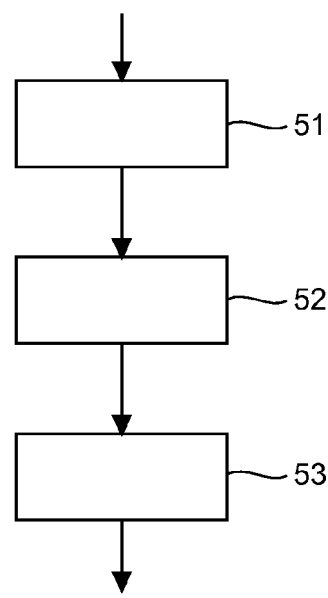
FIG. 5 shows the main steps implemented on the decoding side according to one embodiment of the invention.

Referring now to FIG. 5, we present the main steps for decoding a signal representing a sequence of images as described here above, implemented in an H.264 type video decoder for example.

Such a decoder implements the following steps for at least one current image:
    determining 51 a reference image and at least one image to be compensated for used during an encoding of the current image, from at least one piece of identification information present in the signal,
    obtaining 52 information on rebuilding control vectors for at least one given block of the reference image,
    predicting 53 the current image.

This prediction step 53 implements the same sub-steps as the prediction step 12 and is not described in greater detail here.

It is then possible to add, to the prediction of the current image, a residue of prediction error determined during the encoding and transmitted in the signal so as to rebuild the current image.

5. Structures of the Encoder and of the Decoder

Figure 6:
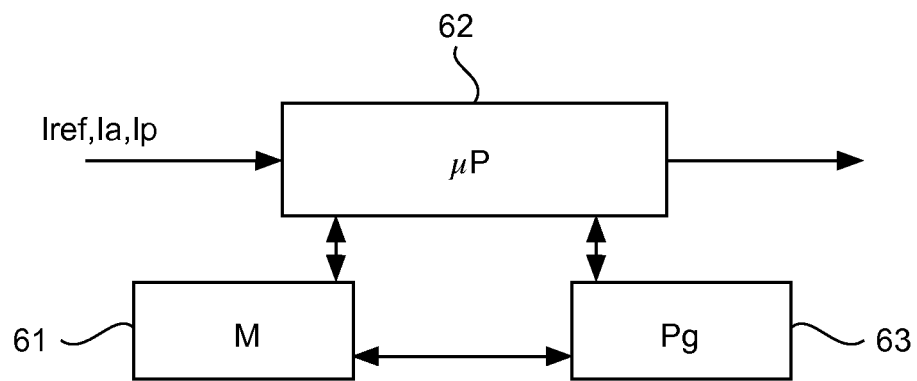
FIGS. 6 and 7 respectively present the structure of an encoding device and a decoding device according to one particular embodiment of the invention.
Figure 7:
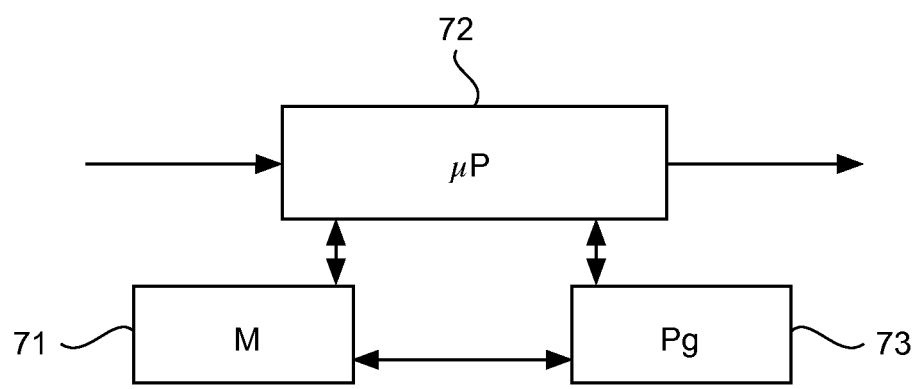

Finally, referring to FIGS. 6 and 7, we present the simplified structures of an encoding and a decoding device respectively implementing an encoding technique and a decoding technique as described here above.

An encoding device, as illustrated in FIG. 6, comprises a memory 61 comprising a buffer memory, a processing unit 62 equipped for example with a microprocessor μP and driven by the computer program 63, implementing the encoding method according to an embodiment of the invention.

At initialization, the code instructions of the computer program 63 are for example loaded into a RAM and then executed by the processor of the processing unit 62. The processing unit 62 receives a sequence of images comprising at least one reference image Iref, one image to be compensated for Ia and one current image Ip. The microprocessor of the processing unit 62 implements the steps of the encoding method described here above according to the instructions of the computer program 63 to determine a prediction of the current image Ip. To this end, the encoder comprises, in addition to the buffer memory 61, means for dividing the reference image into blocks and prediction means associating at least one block of a current image Ip of the sequence with at least one corresponding block in at least one image Ia, of the sequence, to be motion-compensated, delivering a prediction of the current image.

These means are driven by the microprocessor of the processing unit 62.

A decoding device, as illustrated in FIG. 7, comprises a memory 71 comprising a buffer memory, a processing unit 72 equipped for example with a microprocessor μP and driven by the computer program 73 implementing the decoding method according an embodiment of the invention.

At initialization, the code instructions of the computer program 73 are for example loaded into a RAM and then executed by the processor of the processing unit 72. The processing unit 72 inputs a signal representing a sequence of images comprising pieces of information on identification indicating a reference image and one or more images to be motion-compensated, used to encode a current image, and at least one piece of information on rebuilding control vectors for a given block of the reference image. The microprocessor of the processing unit 72 implements the steps of the decoding method described here above according to the instructions of the computer program 73 to determine a prediction of the current image. To this end, the decoding device comprises, in addition to the buffer memory 71, means for determining a reference image and at least one image to be compensated for, used during the encoding of a current image, by means of at least one piece of information on identification present in the signal, means for obtaining information on rebuilding control vectors for at least one given block of the reference image, and means for predicting the current image delivering a prediction of the current image. These means are driven by the microprocessor of the processing unit 72.

Although the present disclosure has been described with reference to one or more examples, workers skilled in the art will recognize that changes may be made in form and detail without departing from the scope of the disclosure and/or the appended claims.

The invention claimed is:

1. A method for encoding a sequence of images, comprising:
    implementing a prediction of least one block of a current image of the sequence from a block of a reference image pre-divided into blocks, said prediction associating at least one block of a current image of said sequence with at least one corresponding block in at least one intermediate image time-localized between said reference image and said current image, to be forward motion-compensated, said intermediate image or images having been previously encoded,
    a phase of optimized partitioning delivering a common partitioning of at least one given block of said reference image, comprising the following steps:
        determining a first plurality of forward motion vectors, called control vectors associated in the current image with several characteristic points of said given block, said control vectors each representing a shift from a characteristic point of said given block of the reference image to a corresponding position of said characteristic point in the current image,
        dividing said given block into sub-blocks in taking account of said first plurality of control vectors defining a first partition,
        determining a second plurality of forward motion vectors, called control vectors associated in the intermediate image, each representing a shift from a characteristic point of said given block of the reference image to a corresponding position of said characteristic point in the intermediate image,
        dividing said given block into sub-blocks in taking account of said second plurality of control vectors, defining a second partition, and obtaining said common partitioning into sub-blocks for said given block, called basic sub-blocks, by union of said first and second partitions, and a phase of predicting said current image from said intermediate image obtained preliminarily from said reference image to which said common partitioning into basic sub-blocks for said given block has been applied, said prediction phase comprising the following steps:

determining a first set of modified control vectors for said basic sub-blocks from the control vectors associated with the block of current image, determining a second set of modified control vectors for said basic sub-blocks from control vectors associated with the intermediate image, forward motion-compensating a basic sub-block shifted in motion by means of said second set of modified control vectors delivering a sub-block of said intermediate image, and forward motion-compensating said sub-block of said intermediate image towards a corresponding sub-block of said current image by means of said first set of modified control vectors.

2. The method according to claim 1, wherein:
the given block in said reference image and the corresponding blocks in said intermediate and current images belong to a same motion tube, a motion tube comprising a block of pixels designed to progress independently of at least one other motion tube, and
said tube is initialized in said reference image.

3. The method according to claim 1, wherein at least one of said steps of dividing said given block into sub-blocks implements two successive passes of dividing into a sub-blocks of adaptive size.

4. The method according to claim 1, wherein at least one of said steps of dividing said given block into sub-blocks implements at least two iterations, until a predetermined stop criterion, proper to said dividing step delivering said first and/or second partition, is reached, said stop criterion belonging to the group consisting of:
a minimum size of a sub-block;
a maximum number of divisions;
a difference between the control vectors associated with two sub-blocks that is below a predetermined threshold.

5. The method according to claim 1, wherein said control vectors for said given block or basic sub-block are each associated with a vertex of said given block or basic sub-block.

6. The method according to claim 1, wherein the method includes a step of insertion, into a signal representing said sequence, of at least one piece of information on identification indicating said reference image and said intermediate image or images used to encode said current image and at least one piece of information on rebuilding said control vectors for said given block.

7. A non-transitory memory readable by a computer and comprising a computer program recorded thereon, which comprises instructions to implement a method for encoding a sequence of images, when said program is executed by a processor, wherein the method comprises:

implementing a prediction of least one block of a current image of the sequence from a block of a reference image pre-divided into blocks, said prediction associating at least one block of a current image of said sequence with at least one corresponding block in at least one intermediate image time-localized between said reference image and said current image, to be forward motion-compensated, said intermediate image or images having been previously encoded, a phase of optimized partitioning delivering a common partitioning of at least one given block of said reference image, comprising the following steps:

determining a first plurality of forward motion vectors, called control vectors associated in the current image with several characteristic points of said given block, said control vectors each representing a shift from a characteristic point of said given block of the reference image to a corresponding position of said characteristic point in the current image, dividing said given block into sub-blocks in taking account of said first plurality of control vectors defining a first partition, determining a second plurality of forward motion vectors, called control vectors associated in the intermediate image, each representing a shift from a characteristic point of said given block of the reference image to a corresponding position of said characteristic point in the intermediate image, dividing said given block into sub-blocks in taking account of said second plurality of control vectors, defining a second partition, and obtaining said common partitioning into sub-blocks for said given block, called basic sub-blocks, by union of said first and second partitions, and a phase of predicting said current image from said intermediate image obtained preliminarily from said reference image to which said common partitioning into basic sub-blocks for said given block has been applied, said prediction phase comprising the following steps:

determining a first set of modified control vectors for said basic sub-blocks from the control vectors associated with the block of current image, determining a second set of modified control vectors for said basic sub-blocks from control vectors associated with the intermediate image, forward motion-compensating a basic sub-block shifted in motion by means of said second set of modified control vectors delivering a sub-block of said intermediate image, and forward motion-compensating said sub-block of said intermediate image towards a corresponding sub-block of said current image by means of said first set of modified control vectors.

8. A device for encoding a sequence of images, comprising:
means for predicting at least one block of a current image of said sequence from a block of a reference image preliminarily divided into blocks, said prediction means associating at least one block of a current image of said sequence with at least one corresponding block in at least one intermediate image time-localized between said reference image and said current image, to be forward motion-compensated, said intermediate image or images having been previously encoded, optimized partitioning means delivering a common partitioning of at least one given block of said reference image, said partitioning means comprising:

means for determining a first plurality of forward motion vectors, called control vectors associated in the current image with several characteristic points of said given block, said control vectors each representing a shift from a characteristic point of said given block of the reference image to a corresponding position of said characteristic point in the current image, means for dividing said given block into sub-blocks in taking account of said first plurality of control vectors defining a first partition, means for determining a second plurality of forward motion vectors, called control vectors associated in the intermediate image, each representing a shift from a characteristic point of said given block of the reference image to a corresponding position of said characteristic point in the intermediate image, means for dividing said given block into sub-blocks in taking account of said second plurality of control vectors defining a second partition, and means for obtaining said common partitioning into sub-blocks for said given block, called basic sub-blocks, by union of said first and second partitions, and means for predicting said current image from said intermediate image obtained preliminarily from said reference image to which said common partitioning into basic sub-blocks for said given block has been applied, said prediction means comprising:

means for determining a first set of modified control vectors for said basic sub-blocks from the control vectors associated with the block of the current image, means for determining a second set of modified control vectors for said basic sub-blocks from control vectors associated with the intermediate image, means for forward motion-compensating a basic sub-block shifted in motion by means of said second set of modified control vectors delivering a sub-block of said intermediate image, and means for forward motion-compensating said sub-block of said intermediate image towards a corresponding sub-block of said current image by means of said first set of modified control vectors.

9. The method of claim 1, further comprising:
generating a signal representing a sequence of images encoded according to the method of claim 1, wherein the signal comprises at least one piece of information on identification indicating a reference image and at least one intermediate image used to encode a current image, and at least one piece of information on rebuilding control vectors for a given block of said reference image.

10. A method for decoding a signal representing a sequence of images, the method comprising the following steps for at least one current image:

determining a reference image and at least one intermediate image, used to encode said current image, by means of at least one piece of information on identification present in said signal, obtaining information on rebuilding control vectors for at least one given block of said reference image, and predicting said current image comprising the following sub-steps for said at least one given block:

determining, from said pieces of rebuilding information, a first plurality of forward motion vectors, called control vectors associated in the current image with several characteristic points of said given block, said control vectors each representing a shift from a characteristic point of said given block of the reference image to a corresponding position of said characteristic point in the current image, dividing said given block into sub-blocks in taking account of said first plurality of motion vectors, called control vectors, defining a first partition, determining, from said pieces of rebuilding information, a second plurality of forward motion vectors, called control vectors associated in the intermediate image, each representing a shift from a characteristic point of said given block to a corresponding position of said characteristic point in the intermediate image, dividing said given block into sub-blocks in taking account of said second plurality of control vectors, defining a second partition, obtaining a common partitioning into sub-blocks for said given block, called basic sub-blocks, by union of said first and second partitions, determining a first set of modified control vectors for said basic sub-blocks, from the control vectors associated with the block of the current image, determining a second set of modified control vectors for said basic sub-blocks, from the control vectors associated with the block of the intermediate image, forward motion-compensating a basic sub-block shifted in motion by means of said second set of modified control vectors, delivering a sub-block of said intermediate image, and forward motion-compensation of said sub-block of said intermediate image towards a corresponding sub-block of said current image by means of said first set of modified control vectors.

11. A non-transitory memory readable by a computer and comprising a computer program recorded thereon, which comprises instructions to implement a method of decoding a signal representing a sequence of images, when said program is executed by a processor, wherein the method comprises the following steps for at least one current image:

determining a reference image and at least one intermediate image, used to encode said current image, by means of at least one piece of information on identification present in said signal, obtaining information on rebuilding control vectors for at least one given block of said reference image, and predicting said current image comprising the following sub-steps for said at least one given block:

determining, from said pieces of rebuilding information, a first plurality of forward motion vectors, called control vectors associated in the current image with several characteristic points of said given block, said control vectors each representing a shift from a characteristic point of said given block of the reference image to a corresponding position of said characteristic point in the current image, dividing said given block into sub-blocks in taking account of said first plurality of motion vectors, called control vectors, defining a first partition, determining, from said pieces of rebuilding information, a second plurality of forward motion vectors, called control vectors associated in the intermediate image, each representing a shift from a characteristic point of said given block and to a corresponding position of said characteristic point in the intermediate image, dividing said given block into sub-blocks in taking account of said second plurality of control vectors, defining a second partition, obtaining a common partitioning into sub-blocks for said given block, called basic sub-blocks, by union of said first and second partitions, determining a first set of modified control vectors for said basic sub-blocks, from the control vectors associated with the block of the current image, determining a second set of modified control vectors for said basic sub-blocks, from the control vectors associated with the block of the intermediate image, forward motion-compensating a basic sub-block shifted in motion by means of said second set of modified control vectors, delivering a sub-block of said intermediate image, and forward motion-compensation of said sub-block of said intermediate image towards a corresponding sub-block of said current image by means of said first set of modified control vectors.

12. A device for decoding a signal representing a sequence of images, wherein the device comprises the following means, activated for at least one current image:

means for determining a reference image and at least one intermediate image used to encode said current image, by at least one piece of information on identification present in said signal, means for obtaining information on rebuilding control vectors for at least one given block of said reference image, and means for predicting said current image comprising the following means for said at least one given block:

means for determining, from said pieces of rebuilding information, a first plurality of forward motion vectors, called control vectors associated in the current image with several characteristic points of said given block, said control vectors each representing a shift from a characteristic point of said given block of the reference image to a corresponding position of said characteristic point in the current image, means for dividing said given block into sub-blocks in taking account of said first plurality of motion vectors, defining a first partition, means for determining, from said pieces of rebuilding information, a second plurality of forward motion vectors, called control vectors associated in the intermediate image, each representing a shift from a characteristic point of said given block of the reference image to a corresponding position of said characteristic point in the intermediate image, means for dividing said given block into sub-blocks in taking account of said second plurality of control vectors, defining a second partition, means for obtaining a common partitioning into sub-blocks for said given block, called basic sub-blocks, by union of said first and second partitions, means for determining a first set of modified control vectors for said basic sub-blocks, from the control vectors associated with the block of the current image, means for determining a second set of modified control vectors for said basic sub-blocks, from the control vectors associated with the block of the intermediate image, means for forward motion-compensating a basic sub-block shifted in motion by means of said second set of modified control vectors, delivering a sub-block of said intermediate image, and means for forward motion-compensation of said sub-block of said intermediate image towards a corresponding sub-block of said current image by means of said first set of modified control vectors.

* * * * *